(12) United States Patent
Aoki

(10) Patent No.: US 8,836,267 B2
(45) Date of Patent: Sep. 16, 2014

(54) TORQUE DETECTION DEVICE AND ELECTRIC POWER STEERING SYSTEM

(71) Applicant: JTEKT Corporation, Osaka (JP)

(72) Inventor: Kaname Aoki, Kashihara (JP)

(73) Assignee: JTEKT Corporation, Osaka (JP)

( * ) Notice: Subject to any disclaimer, the term of this patent is extended or adjusted under 35 U.S.C. 154(b) by 191 days.

(21) Appl. No.: 13/664,227

(22) Filed: Oct. 30, 2012

(65) Prior Publication Data

US 2013/0113410 A1    May 9, 2013

(30) Foreign Application Priority Data

Nov. 8, 2011   (JP) ................................. 2011-244583

(51) Int. Cl.
*G05D 15/00* (2006.01)
*G01L 3/10* (2006.01)
*B62D 6/10* (2006.01)

(52) U.S. Cl.
CPC .. *G01L 3/104* (2013.01); *B62D 6/10* (2013.01)
USPC ........ 318/646; 318/48; 318/136; 318/400.15; 318/431

(58) Field of Classification Search
USPC ...................... 318/48, 136, 400.15, 431, 434
See application file for complete search history.

(56) References Cited

U.S. PATENT DOCUMENTS 4,904,228 A * 2/1990 Frear et al. ..................... 464/152
2002/0050177 A1 * 5/2002 Honjo ......................... 73/862.08
2004/0093961 A1    5/2004 Nakane et al.
2005/0241414 A1   11/2005 Nakane et al.
2006/0123903 A1    6/2006 Gandel et al.
2006/0137474 A1    6/2006 Nakane et al.
2011/0167920 A1    7/2011 Rink et al.

FOREIGN PATENT DOCUMENTS

| JP | A-2004-163303 | 6/2004 |
| JP | A-2004-163304 | 6/2004 |
| JP | 3874642 B2 | 1/2007 |

OTHER PUBLICATIONS

U.S. Appl. No. 13/664,190, filed Oct. 30, 2012, in the name of Kaname Aoki.
Extended European Search Report issued in European Application No. 12191181.2 dated Mar. 11, 2013.
Extended European Search Report issued in European Application No. 12191182.0 dated Mar. 11, 2013.

* cited by examiner

*Primary Examiner* — Bentsu Ro
*Assistant Examiner* — Iftekhar Mustafa
(74) *Attorney, Agent, or Firm* — Oliff PLC

(57) ABSTRACT

A torque detection device includes: a torsion bar that couples a first shaft to a second shaft; a magnet that is fixed to the first shaft; and a pair of magnetic yokes that are fixed to the second shaft and that are arranged to face each other in an axial direction. Each of the magnetic yokes includes a yoke ring and a plurality of lugs that are arranged in a circumferential direction on the corresponding yoke ring. Each yoke ring includes an extending portion that extends radially outward from base portions of the lugs, and a bent portion that is bent in the axial direction from a radially outer end portion of the extending portion. The outer size of the pair of magnetic yokes in the axial direction is larger than or equal to the length of the magnet in the axial direction.

4 Claims, 8 Drawing Sheets

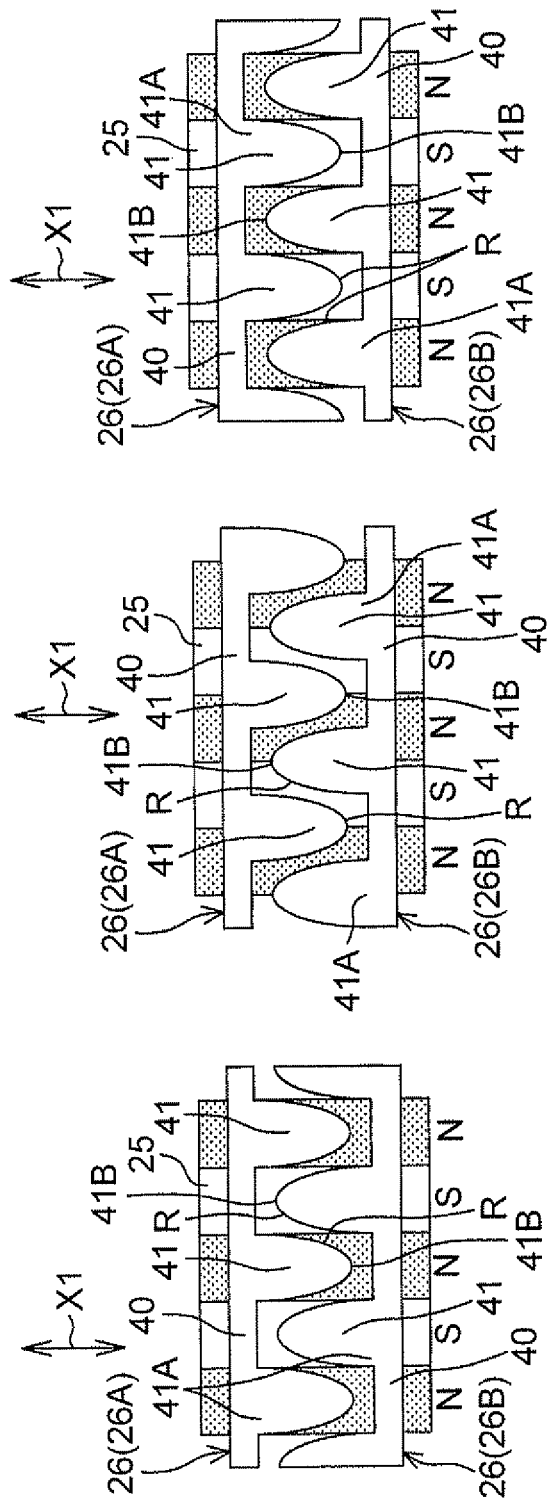

TORQUE DETECTION DEVICE AND ELECTRIC POWER STEERING SYSTEM

INCORPORATION BY REFERENCE/RELATED APPLICATION

This application claims priority to Japanese Patent Application No. 2011-244583 filed on Nov. 8, 2011 the disclosure of which, including the specification, drawings and abstract, is incorporated herein by reference in its entirety.

BACKGROUND OF THE INVENTION

1. Field of the Invention

The invention relates to a torque detection device that detects, for example, a steering torque of a steering wheel and an electric power steering system that includes the torque detection device.

2. Discussion of Background

A torque sensor described in US 2006/0137474 A is formed of a torsion bar, a ring-shaped magnet, a pair of annular magnetic yokes, a pair of magnetic flux concentration rings, a magnetic sensor, and the like. The torsion bar couples an input shaft to an output shaft such that the input shaft and the output shaft are coaxial with each other. The magnet is connected to an end portion of the input shaft. The magnetic yokes are connected to an end portion of the output shaft. The magnetic flux concentration rings are arranged in proximity to the outer peripheries of the magnetic yokes. Each of the magnetic yokes has lugs all around. The number of the lugs is equal to the number of N-poles and S-poles of the magnet. The magnetic flux concentration rings concentrate magnetic fluxes induced from the magnet by the magnetic yokes. The magnetic sensor is placed between the magnetic flux concentration rings, and detects the magnetic flux density generated due to the magnetic fluxes concentrated by the magnetic flux concentration rings.

When torque (steering torque) is input into a portion between the input shaft and the output shaft through a steering operation of a steering wheel, the torsion bar is twisted, and the relative position between the magnet and the magnetic yokes in the circumferential direction changes. The torque sensor detects the steering torque input into the portion between the input shaft and the output shaft on the basis of the magnetic flux density that changes in the magnetic yokes in accordance with the change in the relative position.

In the torque sensor described in US 2006/0137474 A, a portion of each magnetic yoke, at which each lug is provided, has an L-shape such that, when viewed from the circumferential direction of the magnetic yoke, the portion extends radially inward of the magnetic yoke, bends at a substantially right angle and then extends in the axial direction of the magnetic yoke (see FIG. 5 of US 2006/0137474 A). The distal end portions of the lugs of the respective magnetic yokes are arranged alternately in the circumferential direction. In the torque sensor, the lugs through which magnetic fluxes flow are desired to be elongated by extending the lugs in the axial direction in order to improve torque detection capability and torque detection accuracy. However, if the size of each lug in the axial direction (hereinafter, in the specification, referred to as "effective length" where appropriate) is elongated excessively, the distal end of the lug excessively approaches the opposed magnetic yoke. Thus, the magnetic yokes may interfere with each other portions close to each other. In addition, the magnetic flux is likely to unexpectedly leak from the magnetic yoke at that portion of each lug. Therefore, it is difficult for the magnetic sensor to highly accurately detect the magnetic flux density in the magnetic yokes (the density of magnetic fluxes concentrated by the magnetic flux concentration rings). That is, it is difficult for the torque sensor to highly accurately detect a torque.

In addition, it is always desired to reduce the size of the torque sensor.

SUMMARY OF THE INVENTION

The invention provides a torque detection device with improved detection capability and detection accuracy while preventing interference between a pair of magnetic yokes, and an electric power steering system that includes the torque detection device. In addition, the invention provides a more compact torque detection device, and an electric power steering system that includes the torque detection device.

According to a feature of an example of the invention, each yoke ring has an extending portion that extends radially outward from base portions of lugs and a bent portion that is bent in an axial direction from a radially outer end portion of the extending portion, distal end portions of the lugs of one of the magnetic yokes and distal end portions of the lugs of the other magnetic yoke are arranged alternately in a circumferential direction, and the outer size of the pair of magnetic yokes in the axial direction is larger than or equal to the length of a magnet in the axial direction.

In each of the magnetic yokes, the effective length of each lug is increased by the length of the bent portion. In this way, the torque detection device is provided with improved torque detection capability and torque detection accuracy. Further, the outer size of the magnetic yokes in the axial direction is larger than or equal to the length of the magnet in the axial direction. Therefore, it is possible to set the length of the magnet to a value equal to or smaller than the outer size (overall length) of the magnetic yokes. Accordingly, it is possible to reduce the size of the torque detection device.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein:

FIG. 6A is a schematic view that shows a state where a torsion bar is twisted in one direction from a steering neutral state in the torque detection device;

FIG. 6B is a schematic view that shows the steering neutral state;

FIG. 6C is a schematic view that shows a state where the torsion bar 16 is twisted in the direction opposite to the direction in FIG. 6A from the steering neutral state in the torque detection device;

DETAILED DESCRIPTION OF EMBODIMENTS

Hereinafter, embodiments of the invention will be described with reference to the accompanying drawings.

Figure 1:
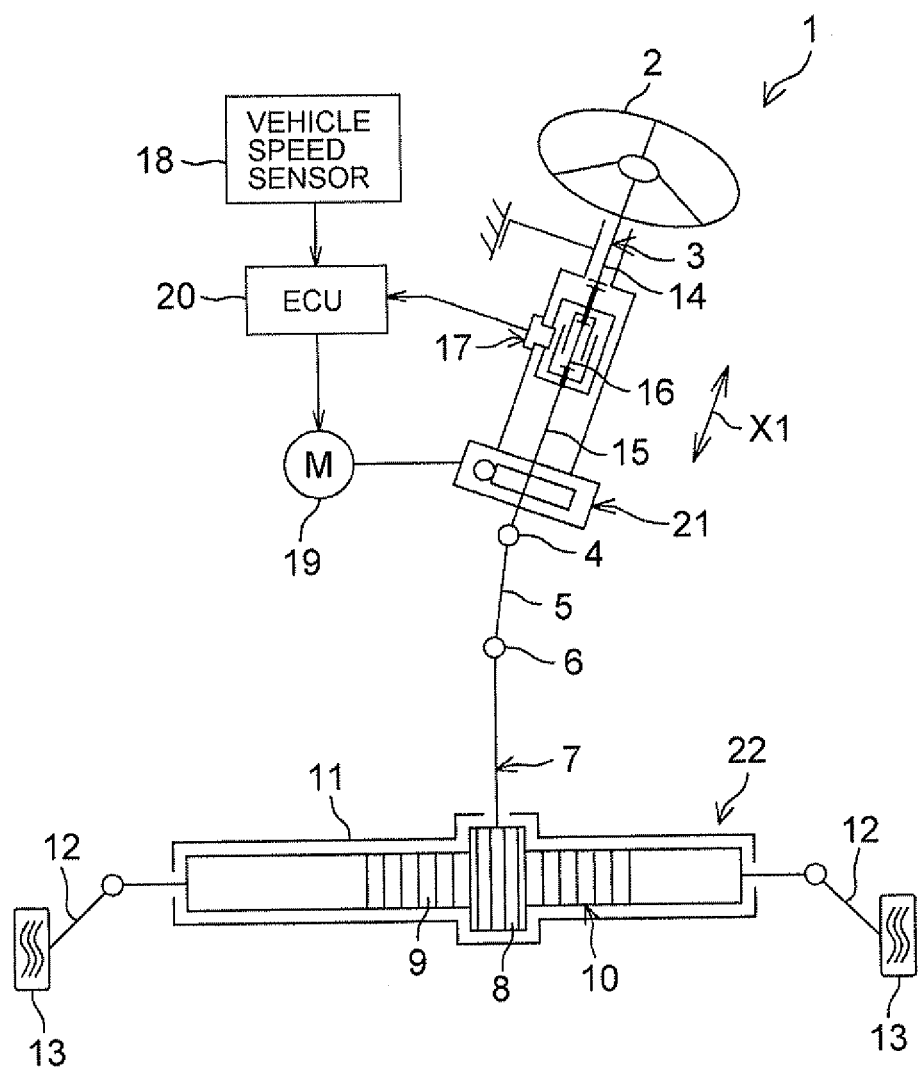
FIG. 1 is a schematic view that shows the schematic configuration of an electric power steering system that includes a torque detection device according to an embodiment of the invention.

FIG. 1 is a schematic view that shows the schematic configuration of an electric power steering system 1 that includes a torque detection device 17 according to an embodiment of the invention. The electric power steering system 1 includes a steering shaft 3, an intermediate shaft 5, a pinion shaft 7 and a rack shaft 10. The steering shaft 3 is coupled to a steering wheel 2. The intermediate shaft 5 is coupled to the steering shaft 3 via a universal joint 4. The pinion shaft 7 is coupled to the intermediate shaft 5 via a universal joint 6. The rack shaft 10 has a rack 9 that is in mesh with a pinion 8 provided at the distal end portion of the pinion shaft 7, and extends in the lateral direction of a vehicle.

The rack shaft 10 is supported by a tubular housing 11 so as to be movable in the axial direction. Tie rods 12 are coupled to respective end portions of the rack shaft 10. Each tie rod 12 is coupled to a corresponding one of steered wheels 13 via a corresponding one of knuckle arms (not shown). When the steering wheel 2 is operated to rotate the steering shaft 3, the rotation is transmitted to the pinion 8 via, for example, the intermediate shaft 5, and is converted into a linear motion of the rack shaft 10 in the lateral direction of the vehicle by the pinion 8 and the rack 9. In this way, the steered wheels 13 are steered.

The steering shaft 3 includes a first steering shaft 14 and a second steering shaft 15. The first steering shaft 14 may function as a first shaft coupled to the steering wheel 2. The second steering shaft 15 may function as a second shaft coupled to the universal joint 4. The first and second steering shafts 14, 15 are coaxially coupled to each other via a torsion bar 16 that may function as an elastic member. The first and second steering shafts 14, 15 are able to transmit torque to each other, and are rotatable relative to each other within a predetermined range. When torsional torque that corresponds to the steering torque of the steering wheel 2 is input into a portion between the first and second steering shafts 14, 15 through a steering operation of the steering wheel 2, the torsion bar 16 is twisted. At this time, the first and second steering shafts 14, 15 are rotated relative to each other.

The electric power steering system 1 includes the torque detection device 17, a vehicle speed sensor 18, a steering assist electric motor 19 and an ECU 20. The torque detection device 17 detects a steering torque applied to the steering wheel 2. The vehicle speed sensor 18 detects a vehicle speed.

The ECU 20 serves as a control unit and includes a microcomputer that executes drive control of the electric motor 19 on the basis of the detected vehicle speed and the detected steering torque.

The torque detection device 17 detects a steering torque applied to the first and second steering shafts 14, 15 from a change in magnetic flux density based on a relative rotational displacement between the first steering shaft 14 and the second steering shaft 15 due to a torsion of the torsion bar 16. When the ECU 20 drives the steering assist electric motor 19, the rotation (driving force) output from the electric motor 19 is reduced in speed by a speed reduction mechanism 21, such as a worm gear mechanism, and is then transmitted to the second steering shaft 15. The torque transmitted to the second steering shaft 15 is further transmitted to a steered mechanism 22 via, for example, the intermediate shaft 5. Thus, driver's steering operation is assisted by the driving force of the electric motor 19. The steered mechanism 22 includes the pinion shaft 7, the rack shaft 10, the tie rods 12, the knuckle arms, and the like.

Figure 2:
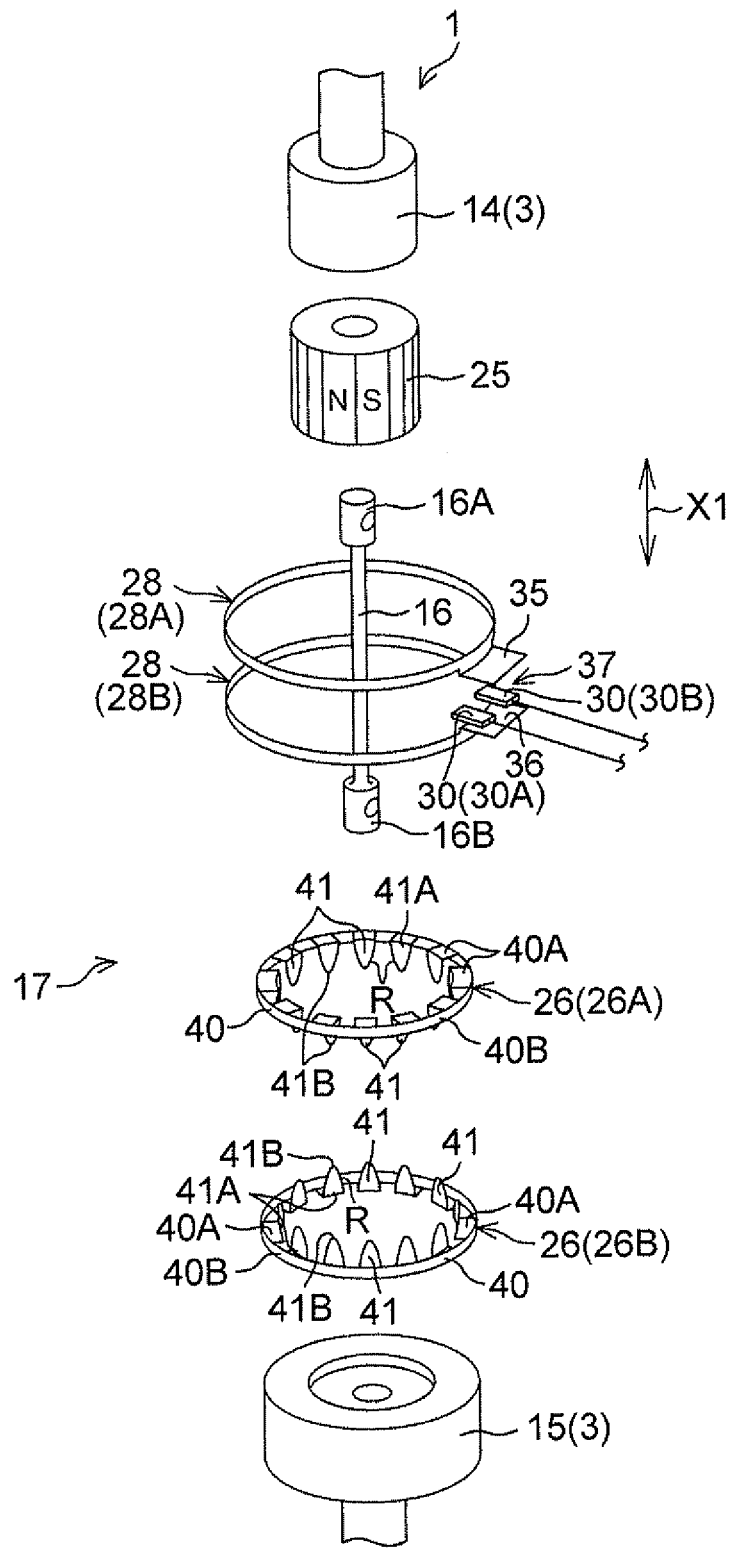
FIG. 2 is an exploded perspective view of the torque detection device.
Figure 3:
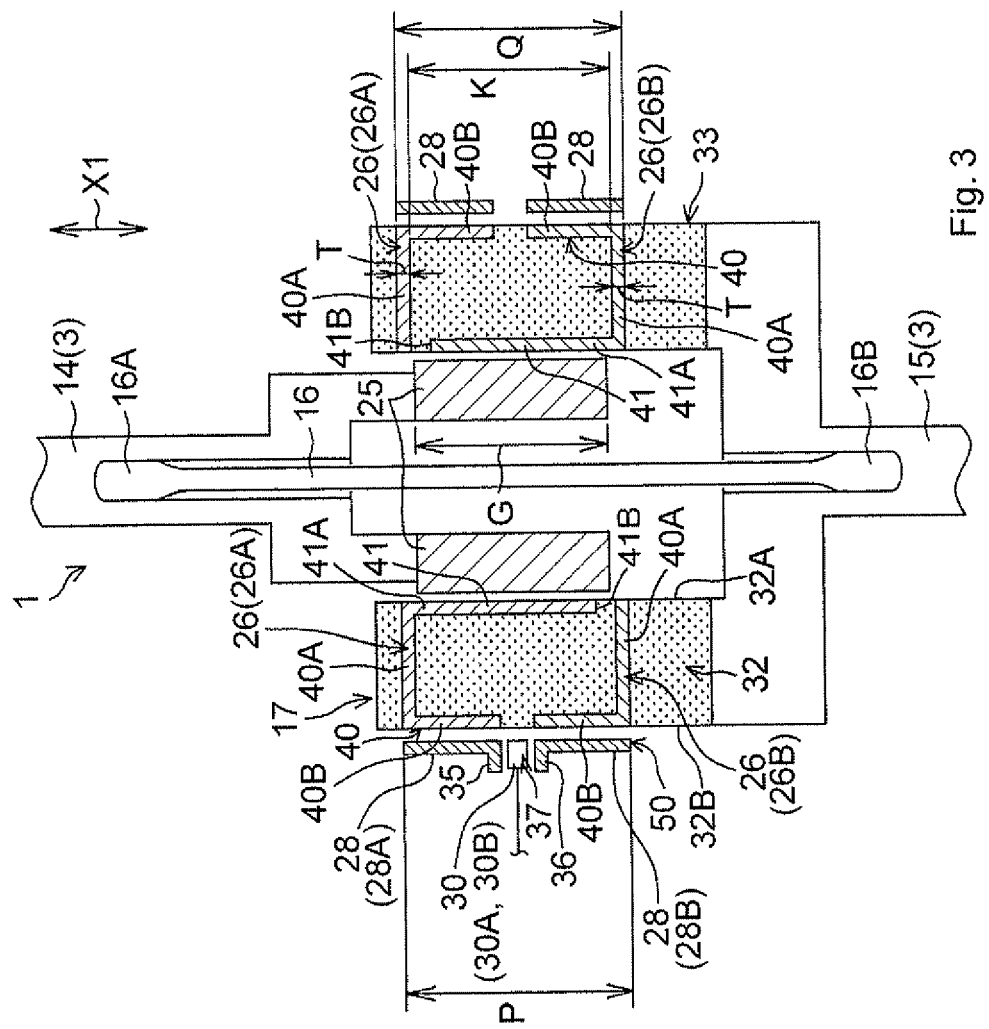
FIG. 3 is a sectional view of the torque detection device.

FIG. 2 is an exploded perspective view of the torque detection device 17. FIG. 3 is a sectional view of the torque detection device 17. As shown in FIG. 2 and FIG. 3, one end 16A of the torsion bar 16 is connected to the first steering shaft 14 by a pin (not shown), or the like, and the other end 16B of the torsion bar 16 is connected to the second steering shaft 15 by a pin (not shown), or the like.

The torque detection device 17 includes the above-described torsion bar 16, a magnet 25, a pair of magnetic yokes 26, a pair of magnetic flux concentration rings 28 and a pair of Hall ICs 30. The magnetic yokes 26 are made of a soft magnetic material. The magnetic flux concentration rings 28 induce magnetic fluxes from the magnetic yokes 26. The Hall ICs 30 may function as a magnetic sensor. In the following description, when one of the magnetic yokes 26, one of the magnetic flux concentration rings 28 and one of the Hall ICs 30 are indicated, "A" is suffixed on the reference numerals, and "B" is suffixed on the reference numerals when the other ones are indicated. In FIG. 2, the upper magnetic yoke 26 is defined as the magnetic yoke 26A, and the lower magnetic yoke 26 is defined as the magnetic yoke 26B. The upper magnetic flux concentration ring 28 is defined as the magnetic flux concentration ring 28A, and the lower magnetic flux concentration ring 28 is defined as the magnetic flux concentration ring 28B. In addition, the left Hall IC 30 is defined as the Hall IC 30A, and the right Hall IC 30 is defined as the Hall IC 30B. Note that the up-down directions in FIG. 2 and FIG. 3 coincide with each other.

The magnet 25 has an annular shape (more specifically, cylindrical shape), and is fixed to one end of the first steering shaft 14 so as to be rotatable together with each other. Multiple N-poles and multiple S-poles are alternately formed in the circumferential direction of the magnet 25. For example, a ferrite magnet may be used as the magnet 25. Because the magnet 25 is coaxially fixed to the first steering shaft 14, the axis of the magnet 25 and the axis of the first steering shaft 14 coincide with each other.

The magnetic yokes 26 are fixed to one end of the second steering shaft 15 so as to be rotatable around the magnet 25. Each of the magnetic yokes 26 has an annular shape. More specifically, each of the magnetic yokes 26 has an annular yoke ring 40 and a plurality of lugs 41 formed integrally with the annular yoke ring 40. The yoke rings 40 are spaced apart from each other and face each other. The lugs 41 are provided at a plurality of circumferential positions one by one on the inner periphery of each yoke ring 40.

Each yoke ring 40 includes rectangular thin-sheet-shaped extending portions 40A and an annular bent portion 40B. The extending portions 40A each extend radially outward from a base portion 41A of each lug 41. The bent portion 40B forms the contour of the yoke ring 40. Each extending portion 40A is thin in the axial direction of the yoke ring 40. All the extending portions 40A are arranged at equal intervals in the circumferential direction. Accordingly, the lugs 41 are arranged at equal intervals in the circumferential direction while protruding (extending) in the axial direction from the extending portions 40A. Each lug 41 has a thin-plate shape in the radial direction of the yoke ring 40. In addition, the bent portion 40B has a certain width in the axial direction, and has a small thickness in the radial direction. The extending portions 40A are connected to one edge (the upper edge in the magnetic yoke 26A, and the lower edge in the magnetic yoke 26B) in the axial direction of the bent portion 40B.

As shown in FIG. 3, when the yoke ring 40 (left-side portion in FIG. 3) of the upper magnetic yoke 26A is viewed from the circumferential direction, the bent portion 40B is bent in the axial direction (downward direction in which the lugs 41 extend) from the radially outer end portions of the extending portions 40A in a state where the lugs 41 extend downward. The extending portions 40A respectively extend radially outward from the base portions 41A of the lugs 41. In addition, as shown in FIG. 3, when the yoke ring 40 (right-side portion in FIG. 3) of the lower magnetic yoke 26B is viewed in the circumferential direction, the bent portion 40B is bent in the axial direction (upward direction in which the lugs 41 extend) from the radially outer end portions of the extending portions 40A in a state where the lugs 41 extend upward. The extending portions 40A extend radially outward from the base portions 41A of the lugs 41. Therefore, a portion of the magnetic yoke 26A at which each lug 41 is provided has a J-shape (when the bent portion 40B is shorter than each lug 41 in the axial direction) or a U-shape (when the bent portion 40B is equal in length in the axial direction to each lug 41) in cross section.

Figure 4:
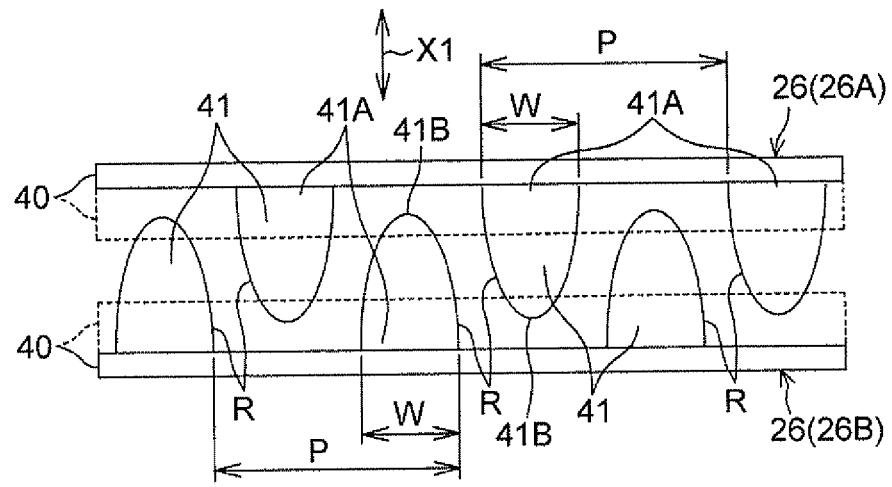
FIG. 4 is a side view of a pair of magnetic yokes as viewed from a position radially outward of the magnetic yokes.

FIG. 4 is a side view when the magnetic yokes 26 are viewed from a position radially outward of the magnetic yokes 26. As shown in FIG. 4, when the magnetic yokes 26 are viewed from a position radially outward of the magnetic yokes 26, the lugs 41 in each of the magnetic yokes 26 each have the same shape and the same size. More specifically, when, in each lug 41, a portion located at a farthest end from the base portion 41A and at the center in the width direction (circumferential direction of the magnetic yoke 26) is defined as a distal end 41B, each lug 41 has a curved profile R of which the width becomes narrower toward the distal end 41B and of which the corners rounded, as viewed from the radial direction.

In FIG. 4, the profile R has a parabolic shape (conic curve) and has a substantially U-shape. When each lug 41 has the parabolic profile R, the profile R is easily reproducible, so it is possible to relatively easily form each lug 41. Alternatively, the profile R may be formed by connecting a plurality of curves having different curvature radii. In this case, by forming the profile R of each lug 41 from a plurality of curves, it is possible to form the lug 41 having a complex curve-shaped profile R according to a design request.

Figure 5:
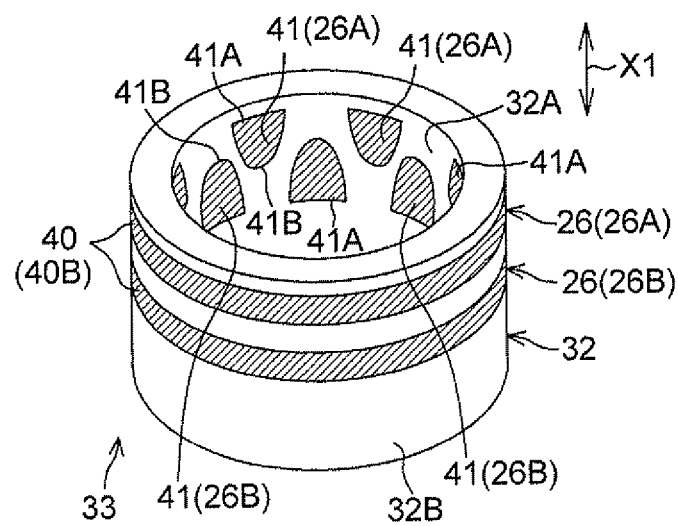
FIG. 5 is a perspective view of a magnetic yoke unit.

FIG. 5 is a perspective view of a magnetic yoke unit 33. With regard to the magnetic yokes 26, the torque detection device 17 includes a cylindrical synthetic resin member 32 as shown in FIG. 5. The magnetic yokes 26 are coaxially arranged to face each other with a predetermined gap left therebetween in the axial direction, and are molded in the synthetic resin member 32 in a state where the magnetic yokes 26 are positioned such that the distal end portions (distal end 41B-side portions) of the lugs 41 are alternately arranged in the circumferential direction (also see FIG. 4). In the magnetic yokes 26, the inner peripheries of the lugs 41 are exposed at an inner periphery 32A of the synthetic resin member 32 in a state where the inner peripheries of the lugs 41 are substantially flush with the inner periphery 32A. In the magnetic yokes 26, the outer peripheries of the bent portions 40B of the yoke rings 40 are exposed at an outer periphery 32B of the synthetic resin member 32 in a state where the outer peripheries of the bent portions 40B of the yoke rings 40 are substantially flush with the outer periphery 32B.

Hereinafter, a set of the paired magnetic yokes 26 and the synthetic resin member 32 that holds the magnetic yokes 26 is referred to as the magnetic yoke unit 33. The magnetic yoke unit 33 has a cylindrical shape. As shown in FIG. 3, in the completed torque detection device 17, the magnetic yoke unit 33 (in other words, the magnetic yokes 26) is coaxially fixed to the second steering shaft 15 and are also coaxial with the first steering shaft 14, and surrounds the magnet 25 from the radially outer side in a noncontact state. Therefore, the magnetic yoke unit 33 is coaxial with the magnet 25. Note that the axial directions of the magnetic yokes 26 (magnetic yoke unit 33), the first steering shaft 14, the second steering shaft 15 and the magnet 25 coincide with one another, and are collectively referred to as "axial direction X1".

Then, in the magnetic yokes 26 positioned in the magnetic yoke unit 33, the outer size Q of the magnetic yokes 26 in the axial direction X1, that is, a value Q that is obtained by adding the thicknesses T of the respective extending portions 40A to a clearance K between the extending portions 40A of the respective yoke rings 40 (=K+T+T) is larger than or equal to the length G of the magnet. Therefore, in the axial direction X1, the magnet 25 is located inside the magnetic yokes 26.

As shown in FIG. 2, the magnetic flux concentration rings 28 are annular members made of a soft magnetic material. The magnetic flux concentration rings 28 are arranged so as to be relatively rotatable around the magnetic yokes 26 while surrounding the magnetic yokes 26 from the radially outer side. The magnetic flux concentration rings 28 are respectively magnetically coupled to the magnetic yokes 26. Specifically, the upper magnetic flux concentration ring 28A faces the bent portion 40B of the upper magnetic yoke 26A from the radially outer side over all around in a noncontact state, and the lower magnetic flux concentration ring 28B faces the bent portion 40B of the lower magnetic yoke 26B from the radially outer side over all around in a noncontact state (see FIG. 3). At this time, the magnetic yokes 26 and the magnetic flux concentration rings 28 are coaxial with each other.

The magnetic flux concentration rings 28 respectively have sheet-shaped magnetic flux concentration plates 35, 36 at one portions in the circumferential direction. The magnetic flux concentration plates 35, 36 are spaced apart from each other and face each other in the axial direction X1. The magnetic flux concentration rings 28 are able to guide magnetic fluxes generated in the magnetic yokes 26 to the corresponding magnetic flux concentration plates 35, 36 and concentrate the magnetic fluxes between the magnetic flux concentration plates 35, 36. The Hall ICs 30 are placed in an air gap 37 formed between the magnetic flux concentration plates 35, 36 (also see FIG. 3). The function of the Hall ICs 30 will be described later.

In the thus configured torque detection device 17, as the magnet 25 and the magnetic yokes 26 rotate relative to each other due to a torsion of the torsion bar 16 as a result of a steering operation of the steering wheel 2, the magnetic flux density between the magnetic yokes 26 changes.

FIG. 6A to FIG. 6C are schematic views for illustrating the operation of the torque detection device 17. FIG. 6A shows a state where the torsion bar 16 is twisted in one direction from a steering neutral state. FIG. 6B shows the steering neutral state. FIG. 6C shows a state where the torsion bar 16 is twisted in the direction opposite to the direction in FIG. 6A from the steering neutral state.

FIG. 6B shows a state where the steering wheel 2 is not operated (steering neutral state). In this case, no steering torque is applied to the first and second steering shafts 14, 15, and, in the magnetic yokes 26, the distal ends 41B of the respective lugs 41 are arranged so as to point at boundaries between the N-poles of the magnet 25 (portions shaded by dots in the magnet 25 shown in FIG. 6A to FIG. 6C) and the S-poles of the magnet 25 (portions with no dots in the magnet 25 shown in FIG. 6A to FIG. 6C). In this state, because the same number of lines of magnetic force from the N-poles and S-poles of the magnet 25 enter into and exit from the lugs 41 of the magnetic yokes 26, the lines of magnetic force are closed in each of the magnetic yoke 26A and the magnetic yoke 26B. Thus, no magnetic flux leaks to a portion between the magnetic yoke 26A and the magnetic yoke 26B, and the magnetic flux density between the magnetic yoke 26A and the magnetic yoke 26B are unchanged at zero.

On the other hand, when a torsional torque is input into a portion between the first steering shaft 14 and the second steering shaft 15 through a steering operation of the steering wheel 2 and thus the torsion bar 16 (see FIG. 3) is twisted, the relative position between the magnet 25 fixed to the first steering shaft 14 and the magnetic yokes 26 fixed to the second steering shaft 15 changes in the circumferential direction. Thus, as shown in FIG. 6A and FIG. 6C, the distal ends 41B of the lugs 41 of the magnetic yokes 26 no longer coincide with the boundaries between the N-poles and S-poles of the magnet 25. Therefore, lines of magnetic force having an N or S polarity increase in each of the magnetic yokes 26. At this time, because lines of magnetic force having opposite polarities increase in the respective magnetic yoke 26A and magnetic yoke 26B, the magnetic flux density (change in magnetic flux density) is generated between the magnetic yoke 26A and the magnetic yoke 26B. The magnetic flux density is substantially proportional to the torsion amount of the torsion bar 16, and the polarity is inverted on the basis of the torsional direction of the torsion bar 16.

As shown in FIG. 3, when the magnetic flux density is generated between the magnetic yoke 26A and the magnetic yoke 26B as described above, the magnetic flux concentration rings 28 guide the magnetic fluxes generated in the magnetic yokes 26 to the magnetic flux concentration plates 35, 36 and concentrate the magnetic fluxes between the magnetic flux concentration plates 35, 36. Therefore, the magnetic flux density is also generated in the air gap 37 formed between the magnetic flux concentration plates 35, 36, as well as between the magnetic yoke 26A and the magnetic yoke 26B. The Hall ICs 30 placed in the air gap 37 detect the magnetic flux density generated due to the magnetic fluxes (originally, magnetic fluxes generated in the magnetic yokes 26) concentrated in the air gap 37 by the magnetic flux concentration rings 28, and acquire the magnetic flux density as electric signals.

The ECU 20 (see FIG. 1) calculates the torsion amount of the torsion bar 16, that is, the steering torque input into the steering shaft 3, on the basis of the electric signals from the Hall ICs 30.

Figure 7A:
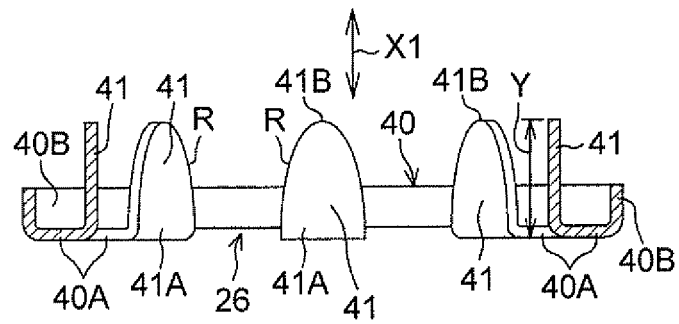
FIG. 7A is an axial sectional view of one of the magnetic yokes.
Figure 7B:
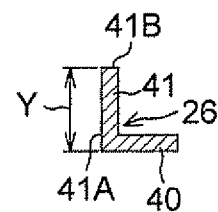
FIG. 7B is a sectional view of a magnetic yoke according to related art.

FIG. 7A is a side view of one of the magnetic yokes 26 when viewed from a position on a flat plane that passes through the circular central position and extends in the axial direction. In FIG. 7A, part of the magnetic yoke 26 is shown in cross section. FIG. 7B is a sectional view of a magnetic yoke 26 in related art.

As shown in FIG. 7A, in the present embodiment of the invention, in each of the magnetic yokes 26, the effective length Y (maximum length in the axial direction X1) of each lug 41 is increased by the length of the bent portion 40B. More specifically, at a portion of each magnetic yoke 26, at which the lug 41 is provided, the bent portion 40B is spaced apart from the bent portion 40B of the opposed magnetic yoke 26 (the magnetic yoke 26 that should be located above the magnetic yoke 26 shown in FIG. 7A), the extending portion 40A extends from the bent portion 40B to the lug 41, and the lug 41 extends toward the opposed magnetic yoke 26. Therefore, in comparison with the case where no bent portion 40B is provided as in the related art shown in FIG. 7B, the effective length Y of each lug 41 is increased by the length of the bent portion 40B. In this way, larger magnetic fluxes are acquired in each of the lugs 41. Therefore, the torque detection device 17 has improved torque detection capability and torque detection accuracy.

In addition, as shown in FIG. 3, when the bent portions 40B are provided, a portion of each magnetic yoke 26, which radially faces the magnetic flux concentration ring 28, serves as the bent portion 40B, and it is possible to ensure a larger area in which the magnetic yokes 26 and the magnetic flux concentration rings 28 face each other. Therefore, magnetic fluxes are efficiently passed from the magnetic yokes 26 to the magnetic flux concentration rings 28. With this configuration as well, the torque detection device 17 is provide with improved torque detection capability and torque detection accuracy.

Here, in each lug 41 having the large effective length Y (see FIG. 7A), the base (base portion 41A) that extends to the bent portion 40B via the extending portion 40A is enlarged, and the distal end 41B-side portion is not brought close to the opposed magnetic yoke 26. Therefore, the magnetic yokes 26 do not interfere with each other, and magnetic fluxes do not easily leak between the magnetic yokes 26.

As described above, it is possible to improve the detection capability and detection accuracy while preventing interference between the magnetic yokes 26. In addition, because the outer size Q of the magnetic yokes 26 in the axial direction X1 is larger than or equal to the length G of the magnet 25, it is possible to set the length of the magnet 25 equal to or smaller than the outer size Q (overall length) of the magnetic yokes 26. Accordingly, it is possible to reduce the size of the torque detection device 17.

Figure 8A:
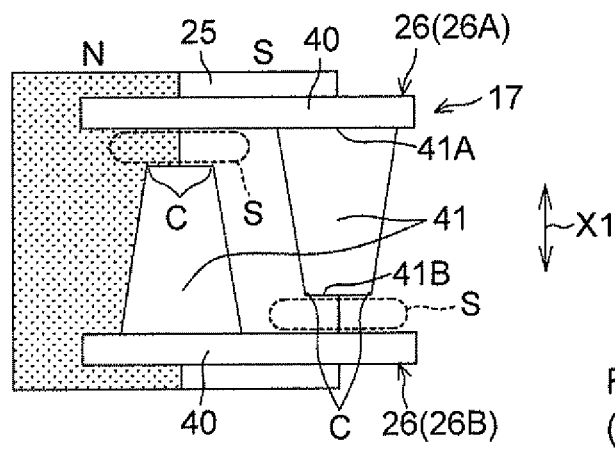
FIG. 8A is a schematic view of a magnet and a pair of magnetic yokes in a torque detection device according to the related art as viewed from a position radially outward of the magnet and the magnetic yokes.
Figure 8B:
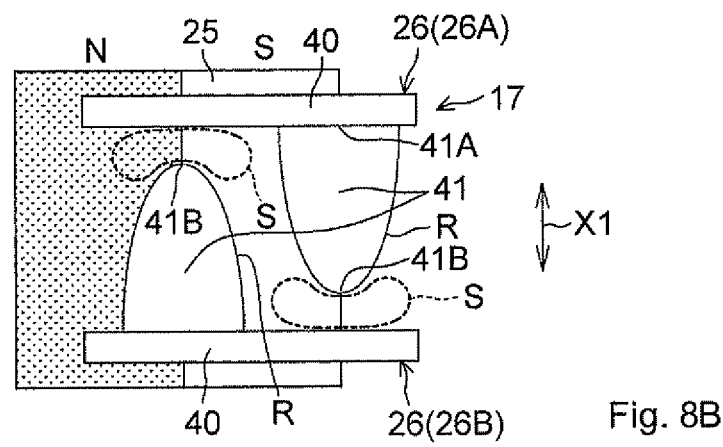
FIG. 8B is a schematic view of a magnet and the magnetic yokes in the torque detection device according to the invention as viewed from a position radially outward of the magnet and the magnetic yokes.
Figure 9:
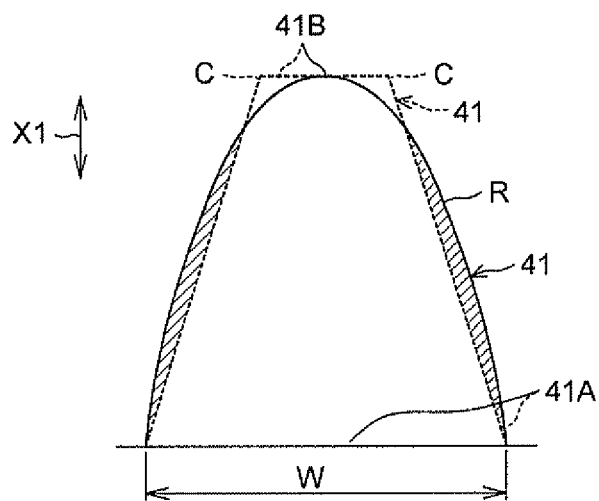
FIG. 9 is a view in which a lug of the torque detection device according to the invention is superimposed on a lug of the torque detection device according to the related art.

FIG. 8A is a schematic view of the magnet 25 and a pair of the magnetic yokes 26 in the torque detection device 17 according to the related art as viewed from a position radially outward of the magnet 25 and the magnetic yokes 26. FIG. 8A shows part of the magnet 25 and part the magnetic yokes 26 in the circumferential direction. FIG. 8B is a schematic view of the magnet 25 and a pair of the magnetic yokes 26 in the torque detection device 17 according to the present embodiment as viewed from a position radially outward of the magnet 25 and the magnetic yokes 26. FIG. 8B shows part of the magnet 25 and part the magnetic yokes 26 in the circumferential direction. FIG. 9 is a view in which the lug 41 of the torque detection device 17 according to the present embodiment of the invention is superimposed on the lug 41 of the torque detection device 17 according to the related art.

The tapered isosceles trapezoidal lugs 41 (see FIG. 8A) in the related art are compared with the lugs 41 (see FIG. 8B) according to the present embodiment of the invention. These lugs 41 are equal in length in the axial direction X1 and equal in maximum width W in the circumferential direction of the base portion 41A (the circumferential direction of the magnetic yoke 26) (see FIG. 9).

In the present embodiment of the invention, the width of each lug 41 of each magnetic yoke 26 becomes narrower toward its distal end and has the curved profile R with rounded corners when viewed from the radial direction of the magnetic yoke 26. Therefore, each lug 41 has a convex-curved shape toward the distal end 41B. Therefore, each lug 41 according to the present embodiment of the invention does not have two corners C that are present at the distal end 41B side of the trapezoidal lug 41 according to the related art. Therefore, in the present embodiment of the invention, a clearance S (a portion surrounded by dashed lines) between the distal end 41B side of each lug 41 and the yoke ring 40 of the opposed magnetic yoke 26 is larger than that in the related art by an amount corresponding to the two corners C.

Because the lug 41 having a convex-curved shape in the present embodiment of the invention has no sharp edges, the magnetic fluxes of the magnetic yokes 26 are less likely to leak. Furthermore, if the lugs 41 having a convex-curved shape are employed, the clearance S between the distal end 41B side of the lug 41 and the yoke ring 40 of the opposed magnetic yoke 26 is relatively large. Therefore, with this configuration as well, magnetic fluxes are less likely to leak also between each lug 41 and the opposed magnetic yoke 26. Therefore, the Hall ICs 30 (see FIG. 3) are able to highly accurately detect the magnetic flux density in the magnetic yokes 26 via the magnetic flux concentration rings 28. As a result, the torque detection device 17 is provided with improved detection capability and detection accuracy.

Figure 10:
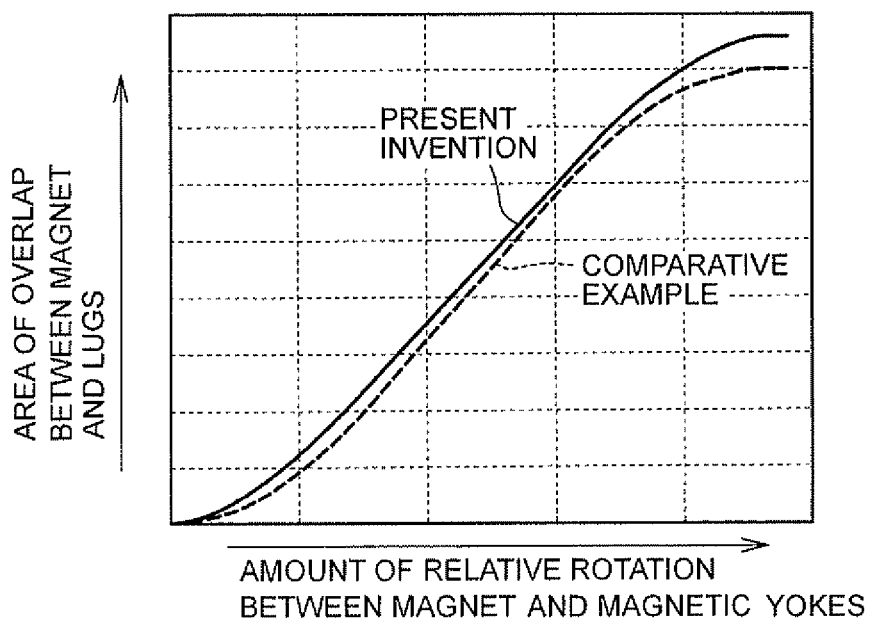
FIG. 10 is a graph that illustrates a state where the area of an overlap between a lug and one pole of the magnet changes as the torsion bar is twisted in the torque detection device.

FIG. 10 is a graph that illustrates the state where the area of an overlap between each lug 41 and one pole of the magnet 25 changes as the torsion bar 16 is twisted in the torque detection device 17. In addition, in the case of the lugs 41 according to the present embodiment of the invention, which have such a convex-curved shape, when the torsion bar 16 is twisted from the above-described steering neutral state (see FIG. 6B and FIG. 8B), the area of an overlap (when viewed in the radial direction) between the N-poles or S-poles of the magnet 25 and the lugs 41 changes on the basis of the torsion amount of the torsion bar 16 (in other words, the amount of relative rotation between the magnet 25 and the magnetic yokes 26) as shown in FIG. 10.

In the present embodiment, because each of the lugs 41 has a convex-curved shape, regions (see hatched portions in FIG. 9) from the base portion 41A to a portion before the distal end 41B are wider than that of each of the lugs 41 according to the related art. Therefore, in the case of the lugs 41 according to the present embodiment of the invention, the area of an overlap between the N-poles or S-poles and the lugs 41 changes in a state where the area is larger that in the case of the lugs 41 according to the related art. In addition, in the case of the lugs 41 according to the present embodiment of the invention, the area changes more linearly and the rate of the change in the area is higher than in the case of the lugs 41 according to the related art (particularly, regions near the start of rising and near the end of rising in the curve of the graph). Therefore, in the torque detection device 17 that uses the lugs 41 according to the present embodiment of the invention, the efficiency of detecting magnetic fluxes (in other words, torque) also improves.

In addition, as shown in FIG. 4, in each of the magnetic yokes 26, the maximum circumferential width W of the base portion 41A of each lug 41 is preferably smaller than or equal to half the pitch P of the adjacent lugs 41 in the circumferential direction. In this case, it is possible to ensure a sufficient clearance between adjacent lugs 41 among the lugs 41 of the two magnetic yokes 26, which are arranged alternately in the circumferential direction. Therefore, it is possible to prevent a leakage of magnetic fluxes between adjacent lugs 41. Thus, it is possible to further improve the detection capability and detection accuracy.

In addition, as shown in FIG. 3, in the torque detection device 17, the Hall ICs 30 detect the density of magnetic fluxes generated in the magnetic yokes 26 in a state where the magnetic fluxes are averaged by the magnetic flux concentration rings 28. Therefore, it is possible to detect the magnetic flux density in the magnetic yokes 26 without variations. As a result, it is possible to further improve the detection capability and detection accuracy. The detection capability and detection accuracy of the steering torque of the steering wheel 2 in the torque detection device 17 are improved in this way. Therefore, in the electric power steering system 1, it is possible to highly accurately assist the steering operation of the steering wheel 2 with the use of the electric motor 19.

The invention is not limited to the above-described embodiment. For example, in the above-described embodiment, the two Hall ICs 30 are used as the magnetic sensor (see FIG. 2). Alternatively, a single Hall IC may be used. In addition, a magnetoresistive element (MR element) may be used as the magnetic sensor, instead of the Hall IC. In addition, the number of poles of the magnet 25 may be selectively set to, for example, 12 poles, 16 poles, 18 poles, or 24 poles.

Figure 11:
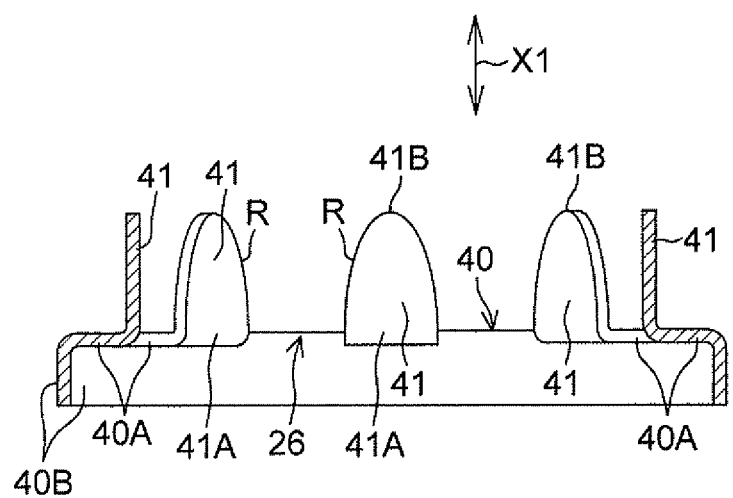
FIG. 11 is a side view of each magnetic yoke according to another embodiment of the invention as viewed from a position on a flat plane that passes through a circular central position of the magnetic yoke and extends in an axial direction of the magnetic yoke.

FIG. 11 is a side view of each magnetic yoke 26 according to another embodiment when viewed from a position on a flat plane that passes through the circular central position of the magnetic yoke 26 and extends in the axial direction. In the yoke ring 40 of each magnetic yoke 26 according to the above-described embodiment, the bent portion 40B is bent in a direction, in which the lugs 41 extend, from the radially outer end portion of the extending portions 40A in the axial direction X1 (see FIG. 7A). Alternatively, as shown in FIG. 11, the bent portion 40B may be bent in the direction opposite to the direction in which the lugs 41 extend. In this case, a portion of each magnetic yoke 26 at which each lug 41 is provided has a crank shape when viewed from the circumferential direction.

Note that, as shown in FIG. 3, the clearance in the axial direction X1 between the magnetic flux concentration rings 38 may be constant, and the magnetic flux concentration rings 38 may be a magnetic flux concentration ring assembly 50 of which the relative position is set. In this case, when a clearance K in the axial direction X1 between the extending portions 40A of the magnetic yokes 26 is larger than a maximum length P of the magnetic flux concentration ring assembly 50, the bent portion 40B may be bent in the direction in which the lugs 41 extend and the bent portion 40B may face the corresponding magnetic flux concentration ring 38 from the radially inner side. On the other hand, when the clearance K is smaller than the maximum length P of the magnetic flux concentration ring assembly 50, the bent portion 40B may be bent in the direction opposite to the direction in which the lugs 41 extend (see FIG. 11) and the bent portion 40B may face the corresponding magnetic flux concentration ring 38 from the radially inner side. By changing the bent direction of the bent portion 40B, it is possible to use the same magnetic flux concentration ring assembly 50.

In the above-described embodiment, the torque detection device that includes the magnetic flux concentration rings is applied to the electric power steering system for an automobile. Alternatively, the torque detection device according to the invention may be applied to systems or devices other than the electric power steering system.

What is claimed is:

1. A torque detection device, comprising:

an elastic member that couples a first shaft to a second shaft such that the first shaft and the second shaft are rotatable relative to each other, and that is twisted as a torsional torque is input into a portion between the first shaft and the second shaft;

an annular magnet that is coaxially fixed to the first shaft, and in which N-poles and S-poles are alternately formed in a circumferential direction;

a pair of annular magnetic yokes that are coaxially fixed to the second shaft, that surround the magnet in a noncontact state, and that are arranged so as to face each other in an axial direction;

a pair of annular magnetic flux concentration rings that respectively surround the pair of magnetic yokes and that guide and concentrate the magnetic fluxes generated in the pair of magnetic yokes, and a magnetic sensor that is arranged between the pair of magnetic flux concentration rings and that detects the density of magnetic fluxes concentrated by the magnetic flux concentration rings, wherein each of the pair of magnetic yokes includes an annular yoke ring and a plurality of lugs that are extended in the axial direction from the corresponding yoke ring and that are arranged at equal intervals in the circumferential direction, each yoke ring includes an extending portion that extends radially outward from base portions of the lugs and a bent portion that is bent in the axial direction from a radially outer end portion of the extending portion, and distal end portions of the lugs of one of the magnetic yokes distal end portions of the lugs of the other magnetic yoke are arranged alternately in the circumferential direction, and an outer size of the pair of magnetic yokes in the axial direction is larger than or equal to a length of the magnet in the axial direction.

2. The torque detection device according to claim 1, wherein each bent portion is bent in a direction in which the lugs extend.

3. The torque detection device according to claim 1, wherein each bent portion is bent in a direction opposite to a direction in which the corresponding lugs extend.

4. An electric power steering system, comprising:

the torque detection device according to claim 1, which detects a steering torque applied to a steering wheel;

an electric motor that generates driving force for assisting steering operation of the steering wheel; and a control unit that controls the electric motor on the basis of the steering torque detected by the torque detection device.

* * * * *